(12) United States Patent
Park (10) Patent No.: US 7,864,883 B2
(45) Date of Patent: Jan. 4, 2011

(54) METHOD AND APPARATUS FOR MODULATING DIGITAL SIGNAL USING EQUILATERAL TRIANGULAR CONSTELLATION

(75) Inventor: Sung-Joon Park, Gangneung-si (KR)

(73) Assignee: Gangneung-Wonju National University Industry Academy Cooperation Group, Gangneung-si (KR)

( * ) Notice: Subject to any disclaimer, the term of this patent is extended or adjusted under 35 U.S.C. 154(b) by 909 days.

(21) Appl. No.: 11/593,351

(22) Filed: Nov. 6, 2006

(65) Prior Publication Data

US 2007/0291874 A1    Dec. 20, 2007

(30) Foreign Application Priority Data

Jun. 20, 2006    (KR) .................. 10-2006-0055241

(51) Int. Cl.
*H04L 27/36*    (2006.01)
*H04L 27/00*    (2006.01)
(52) U.S. Cl. ................. 375/298; 332/103; 332/145
(58) Field of Classification Search ......... 375/259–261, 375/295, 298; 329/304; 332/103–105, 144–145, 332/149, 151
See application file for complete search history.

(56) References Cited

U.S. PATENT DOCUMENTS

| | | | | |
|---|---|---|---|---|
| 4,860,316 A | * | 8/1989 | Takenaka et al. | 375/264 |
| 5,742,643 A | * | 4/1998 | Reeves et al. | 375/243 |
| 6,310,925 B1 | * | 10/2001 | Kitta | 375/326 |
| 2008/0285669 A1 | * | 11/2008 | Walton et al. | 375/260 |

OTHER PUBLICATIONS

Publication: In-Whan Kim, et al., "A Study on the 256-Qam Method with Signals of Triangular Arrangement," *Korea Information and Communications Society*, 1992.

* cited by examiner

*Primary Examiner*—David C Payne
*Assistant Examiner*—James M Perez
(74) *Attorney, Agent, or Firm*—Olson & Cepuritis, Ltd.

(57) ABSTRACT

Disclose is a modulation method that transmits n bits per modulation symbol, comprising the steps of: (a) generating a constellation of which $2^n$ constellation points are arranged to be angular point of equilateral triangle; (b) generating a modulation symbol by mapping the constellation point with digital signal. According to the present invention, average power consumed by constellation points can be reduced by using equilateral triangular constellation.

5 Claims, 8 Drawing Sheets

METHOD AND APPARATUS FOR MODULATING DIGITAL SIGNAL USING EQUILATERAL TRIANGULAR CONSTELLATION

CROSS REFERENCES TO RELATED APPLICATION

This application is based upon priority Korean Patent Application No. 10-2006-0055241 filed Jun. 20, 2006.

FIELD OF THE INVENTION

The present invention relates to a method and device for modulating digital signal.

BACKGROUND OF THE INVENTION

In wire communication and wireless communication system, digital modulation is performed in order to transmit information effectively. The one of the most representative digital modulation is Quadrature Amplitude Modulation (QAM). In QAM, digital signal comprising bit row is modulated by changing amplitude and phase of carrier wave.

Figure 1:
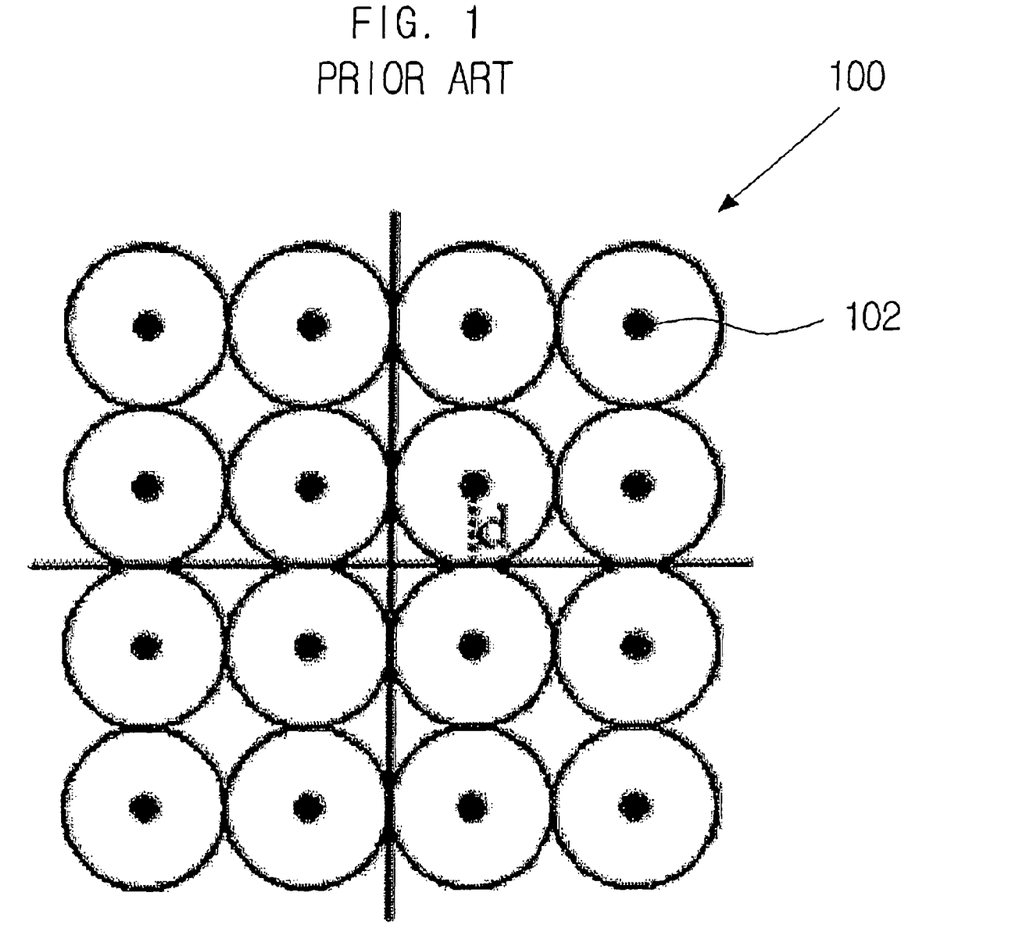
FIG. 1 illustrates a conventional square form constellation.

FIG. 1 illustrates a conventional constellation. In FIG. 1, the constellation having 16 constellation points in conventional 16-QAM is illustrated.

Herein, the constellation is also referred to as I/Q 플롯 plot signal space figure. In 16-QAM, 4 bit binary digital signal (modulation symbol) per one constellation point can be transmitted through 16 signal spaces of which the phases and amplitudes are different from one another.

In more detail, bit stream is divided into groups having 1 bit or more than 1 bit, and mapping the each group with one of constellation points is performed, the each of constellation points corresponding to one modulation symbol.

On the other hand, as shown in FIG. 1, as each of constellation points of conventional constellation is arranged to be angular point of square, it is referred to as square constellation (Square QAM).

In square form constellation, distance between two adjacent constellation points is always 2d, and average power consumed by all 16 constellation point is calculated by following equation 1.

$$P_{av1}=10d^2 \qquad \text{[equation 1]}$$

However, the conventional art is not optimized in view of power efficiency and modulation method of which the power efficiency is improved is required.

On the other hand, if average power is consumed by equation 1, the average power can be reduced by shortening distance between the constellation points. However, if distance between the constellation points is shortened, modulation symbol error rate becomes higher. Therefore, method that can reduce average power consumption while maintaining modulation symbol error rate is required.

SUMMARY OF THE INVENTION

In order to solve above-mentioned problems, the present invention provides a method and device for modulating digital signal that can reduce power consumption for improving power efficiency of modulation.

The present invention further provides a method and device for modulating digital signal that can minimize modulation symbol error rate while reducing power consumed in constellation points.

According to an aspect of the present invention, there is provided a modulation method that transmits n bits per modulation symbol, comprising the steps of: (a) generating a constellation of which $2^n$ constellation points are arranged to be angular point of lattice form triangle; (b) generating a n bit modulation symbol by mapping the constellation point with digital signal.

Preferably, the method may further comprise the step of transforming the parallel digital signal into parallel n bits, wherein the parallel n bits are mapped with the constellation point in said step (b).

The above method may further comprise the step of shifting the modulation symbol into high frequency using a carrier wave.

when the number of the constellation points are 16 and distance between the constellation points are 2d, average consumption power of each constellation point is $9d^2$.

According to another aspect of the present invention, there is provided a modulation device that transmits n bets per modulation symbol, comprising: a modulation symbol generator for mapping digital signal with constellation points of a constellation to generate n bit modulation symbol, wherein the constellation points of the constellation are arranged to be angular point of lattice form triangle.

A more detailed description of the invention is provided in the following description and appended claims taken in conjunction with the accompanying drawings.

DETAILED DESCRIPTION OF THE INVENTION

The following is a detailed description and explanation of the preferred embodiments and best modes for embodying the invention along with some examples thereof.

Hereinafter, preferred embodiments of the present invention are described referring to accompanying figures.

Figure 2:
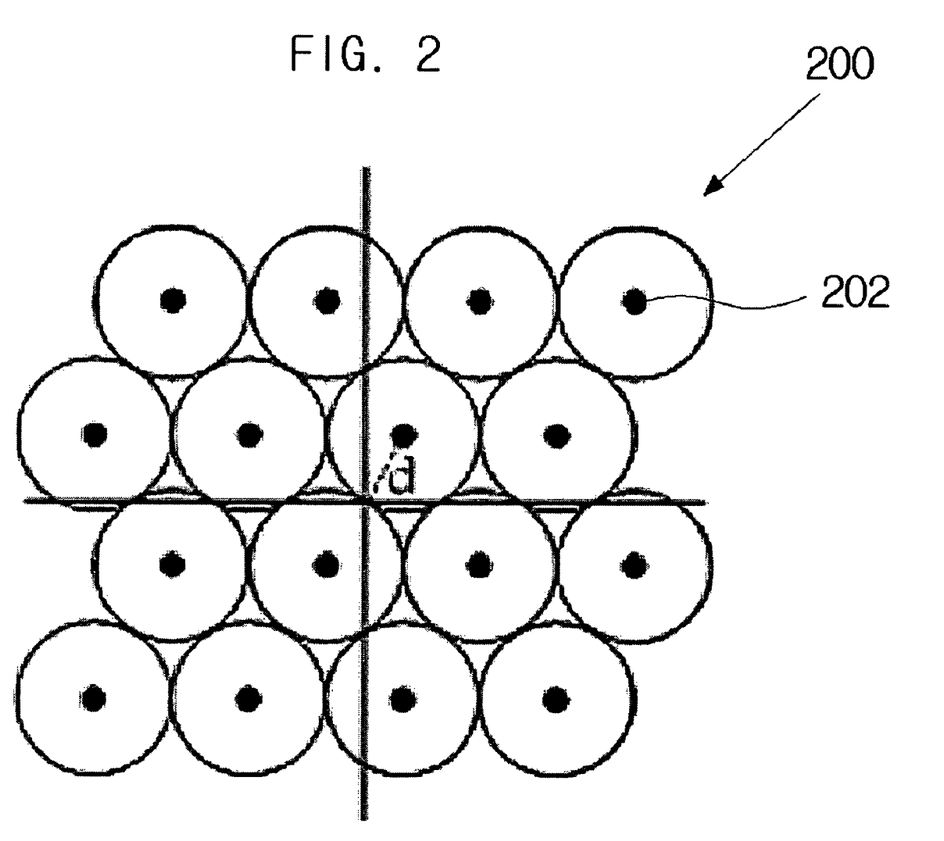
FIG. 2 illustrates a constellation according to a preferred embodiment of the present invention.

FIG. 2 illustrates a constellation according to a preferred embodiment of the present invention.

The constellation of the present invention is applied to modulation by which n (n is natural number more than 2) bits per modulation symbol is transmitted. When n bit are allocated per modulation symbol, constellation (200) of which $2^n$ constellation points are arranged to be angular point of equilateral triangle is provided.

FIG. 2 illustrates constellation that is applied to 16-QAM having 16 constellation points by allocating 4 bits per modulation symbol. However, the present invention can also be applied to other QAM (3 bits, 5 bits, 6 bits, 7 bits and 8 bits are allocated for each modulation symbol) having 8, 32, 64, 128 and 256 constellation points. Moreover, it would be obvious to those skilled in the art that the present invention can be applied to all cases that constellation of which constellation points are arranged to be angular point of equilateral triangle.

In the present invention, the constellation is I/O plot signal space figure used in QAM modulation. The distance between starting point of signal coordinate and each constellation point implies amplitude of signal, and constellation point angle based on I axis implies phase.

Herein, the I/Q plot represents baseband signal carried in sinusoidal wave in complex number coordinate system, and from the view point of signal, real number axis (X axis) refers to I axes (channel), imaginary number axis (Y axis) refers to Q axis (channel).

In the present invention, Constellation of which each constellation points are arranged to be angular point of equilateral is generated. Herein, the generation of the constellation refers to generation of mapping table for mapping digital signal divided by n bits with constellation points arranged to be angular point of equilateral triangle.

Likewise, as constellation that is not square form but equilateral triangular form is generated, average power consumption of each constellation point can be reduced and modulation symbol error rate can be reduced while consuming same power compared with conventional art.

In order to explain this in more detail, FIG. 1 and FIG. 2 are compared. In constellation shown in FIG. 2, although distance between constellation points becomes 2d, concentric circles based on each constellation point are arranged with higher density compared with FIG. 1.

When constellation points are arranged to be angular points of equilateral triangle, the average power is calculated by following equation 2.

$$P_{av2} = 9d^2 \quad \text{[Equation 2]}$$

On the basis of above equation 1 and equation 2, power gain (PG) of the present invention is calculated by following equation 3 and equation 4.

$$PG = \frac{P_{av1}}{P_{av2}} = \frac{10}{9} \quad \text{[equation 3]}$$

$$PG[dB] = 10\log\frac{P_{av1}}{P_{av2}} = 0.46[dB] \quad \text{[equation 4]}$$

That is, according to the present invention, power consumption can be reduced by 0.46 dB compared with the conventional case although distance between constellation points are same as that of constellation points of conventional square QAM using square form constellation.

Figure 5:
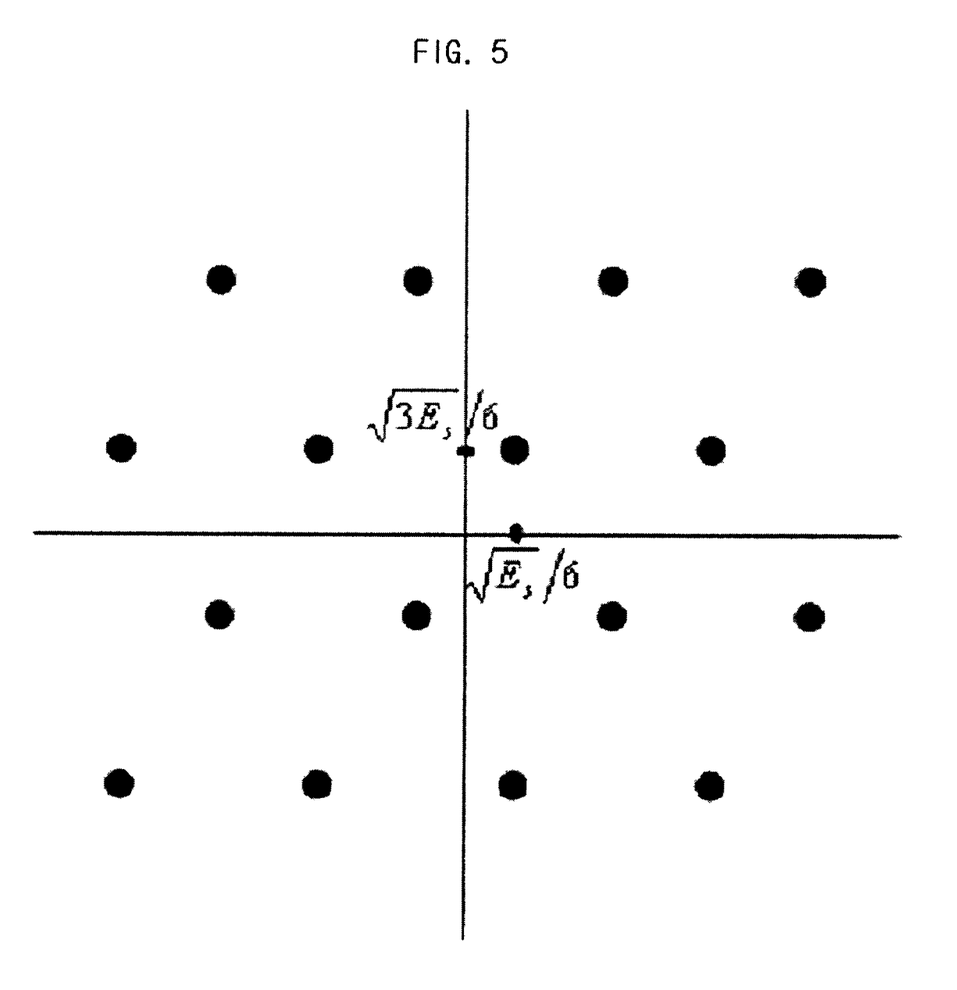
FIG. 5 illustrates average power consumed in each modulation symbol according to the present invention.

Reduction of average power can also be shown by FIG. 5

On the other hand, distance between constellation points is associated with modulation symbol error rate. The longer the distance is longer, the lower is the modulation symbol error rate.

According to the present invention, when distance between adjacent constellation points is same as that of conventional QAM, lower average power is consumed. Therefore, if same average power is used, modulation symbol error rate can be reduced by lengthening distance between adjacent constellation points.

By using constellation of the present invention, modulation device of the present invention generates modulation symbol by mapping digital signal having n bits with constellation points of the present invention.

Figure 6:
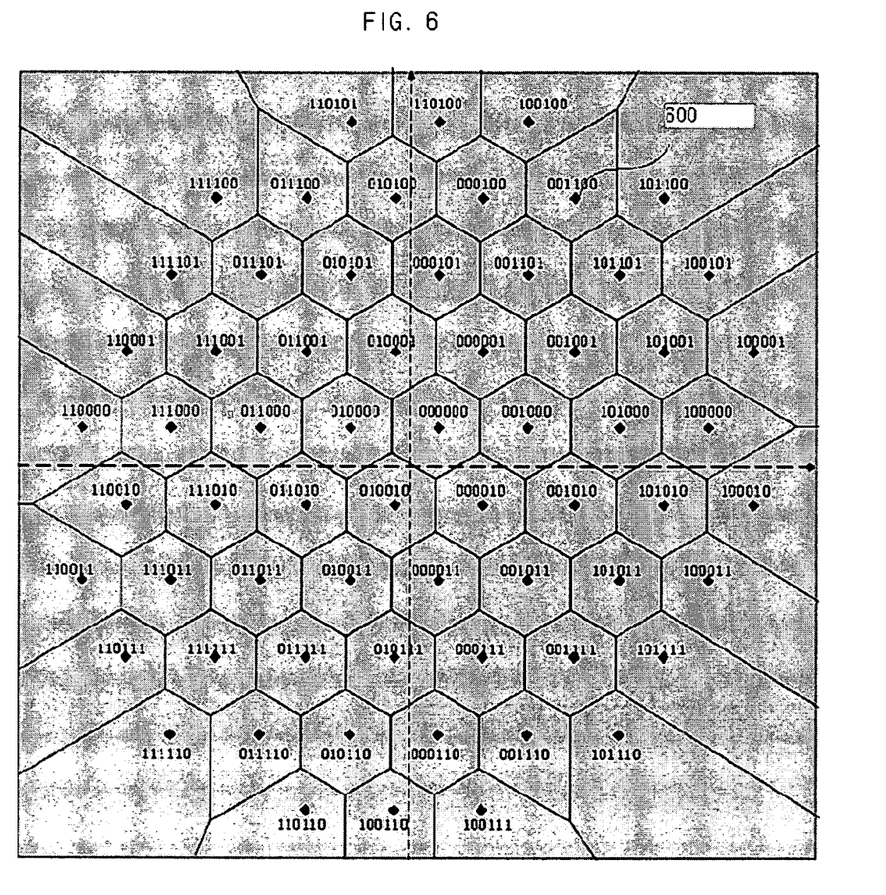
FIG. 6 illustrates a constellation according to another embodiment of the present invention.

It should be noted that the present invention is not limited to FIG. 2 showing circle form. It would be obvious to those skilled in the art that the coverage range of a constellation point can also be multi angular form such as FIG. 6.

Figure 3:
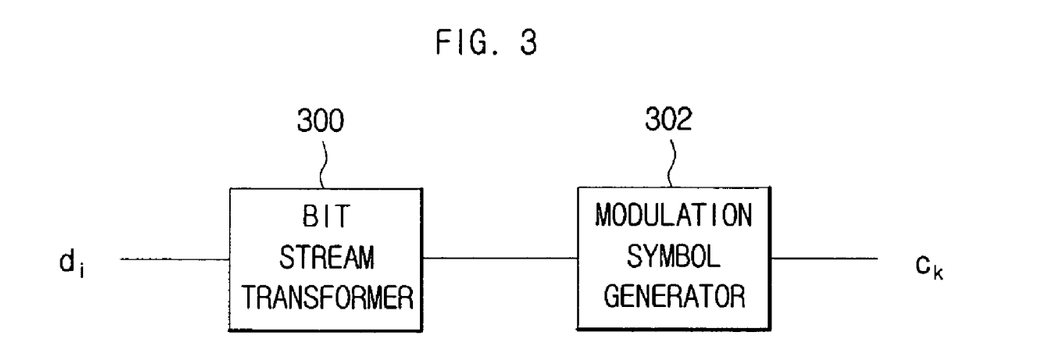
FIG. 3 illustrates a modulation device according to a preferred embodiment of the present invention.

FIG. 3 illustrates a modulation device according to a preferred embodiment of the present invention.

Referring to FIG. 3, the modulation device of the present invention may comprise a bit stream transformer 300 and a modulation symbol generator 302.

The bit stream transformer transforms information bits inputted in serial or parallel into parallel information bits ($d_i$) which are input of the modulation symbol generator 302.

The number of parallel information bits depend on modulation method. In case of 16-QAM, the parallel information bits may be 4 bits.

As described above, the bit stream transformer 300 transforms information bits (digital signal) inputted in serial or parallel into desired bits (bit per modulation symbol). However, the case that the information bits are inputted in serial is described in the following.

When information bits are inputted in serial in 16-QAM (4 bits per information symbol is allocated), the bit stream transformer 300 outputs 4 information bits ($d_0$, $d_1$, $d_2$, $d_3$) in parallel as shown in FIG. 2

Before information bits are inputted to the bit stream transformer 300, quantization and encoding of analogue signal is performed. However, quantization and encoding of analogue signal is well-known technology, detailed explanation would be omitted.

On the other hand, 4 parallel information bits are inputted to the modulation symbol generator 302 in above example, and the modulation symbol generator 302 performs mapping for the input with one constellation point (Ck) of 16 constellation points for outputting.

Herein, the modulation symbol is value that digital signal with n information bits is mapped with the constellation point.

The modulation symbol outputted through the modulation symbol generator 302 is applied to physical layers, and shifted to high frequency by carrier wave, and transmitted to a receiver through a predetermined communication channel.

The modulation symbol transmitted to the receiver is demodulated into original signal by a predetermined algorithm.

Figure 4:
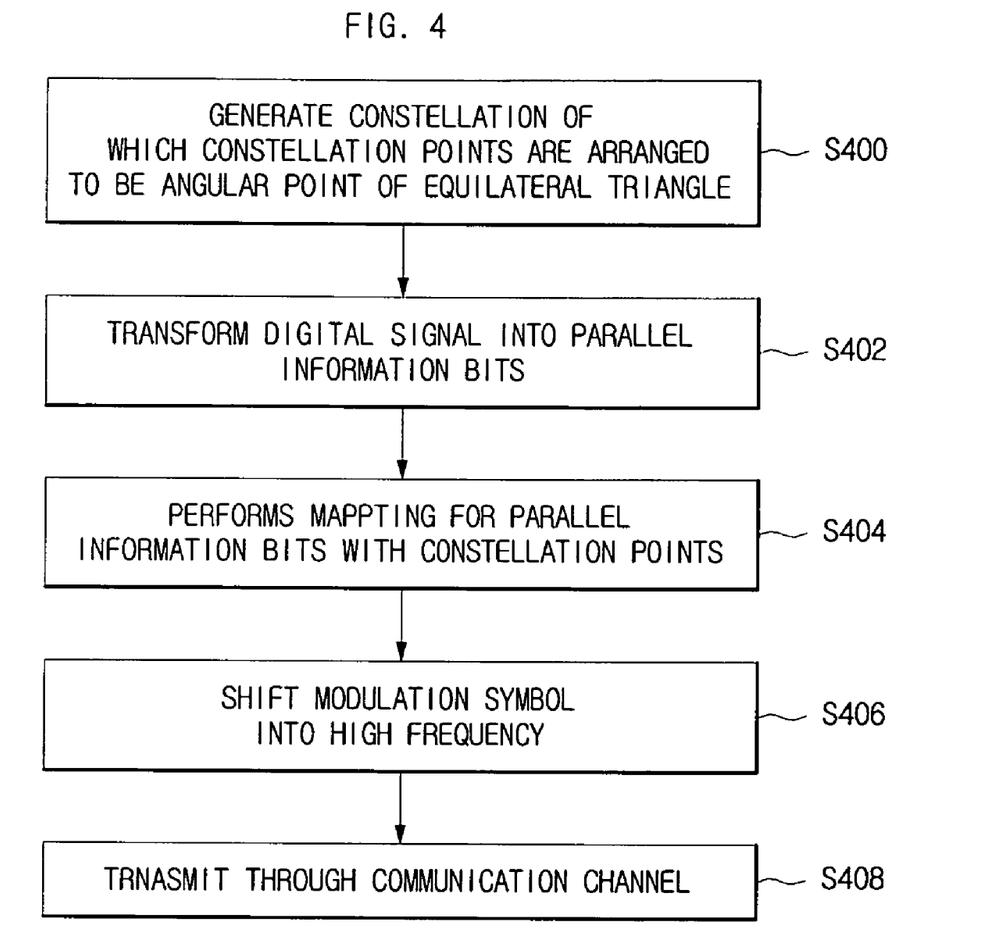
FIG. 4 is a flow chart for modulation process according to the present invention.

FIG. 4 is a flow chart for modulation process according to the present invention.

Referring to FIG. 4, the constellation of which constellation points are arranged to be angular point of equilateral triangle is generated in step 400.

As described above, the generation of the constellation may be generation of mapping table (look-up table) for arranging each constellation point to be angular point of equilateral triangle.

Further, quantization and encoding of signal to be transmitted is performed, and the bit stream transformer 300 transforms encoded digital signal into parallel information bits which are inputted to the modulation symbol generator 302.

At this time, the digital signal may be divided by n bits and the divided n bits may be transformed into parallel bits.

The modulation symbol generator 302 performs mapping for the inputted parallel information bits with each constellation point arranged to be angular point of equilateral triangle in step 404.

In 16-QAM, the information bits may be 4 bits and the number of constellation points may be 16. However, in 64 or 256-QAM, the number of information bits and the number of constellation points may be different.

The modulation symbol generated by mapping the information bits with the constellation point is shifted into high frequency by carrier wave in step 406, and transmitted to receiver side through communication channel in step 408.

In above description, the case that constellation points are arranged such as FIG. 2 is described. However, the present invention is not limited to the case of FIG. 2, the constellation points are arranged in more various ways while maintaining feature (constellation points are arranged to be angular point of equilateral triangle) of the present invention.

Figure 7:
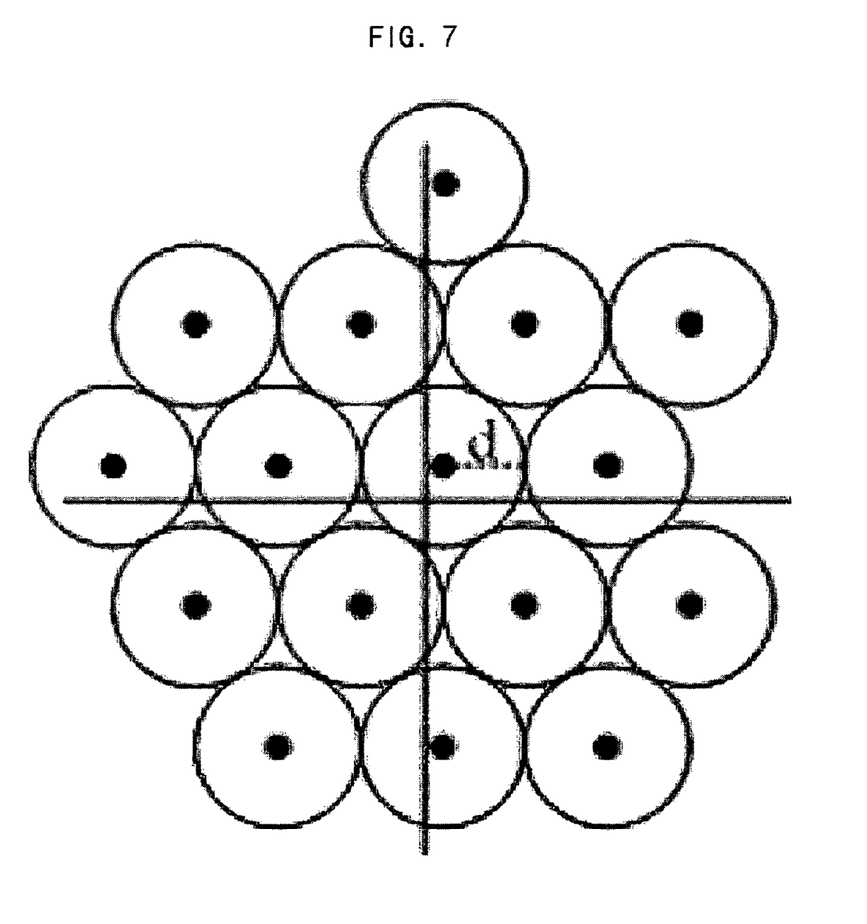
FIG. 7 illustrates a constellation according to another embodiment of the present invention.

FIG. 7 illustrates a constellation according to another embodiment of the present invention. Constellation of FIG. 7 is also applied to 16-QAM having 16 constellation points by allocating 4 bits per modulation symbol.

FIG. 7 illustrates the constellation for optimizing average power consumed better than the case of FIG. 2. In constellation points are arranged such as FIG. 7, the average power consumed becomes $8.75d^2$ which is better than the case of FIG. 2 ($9d^2$). In case of FIG. 7, the modulation or demodulation of signal may be a bit more complicated, however, it can be more optimized in view of power efficiency.

Figure 8:
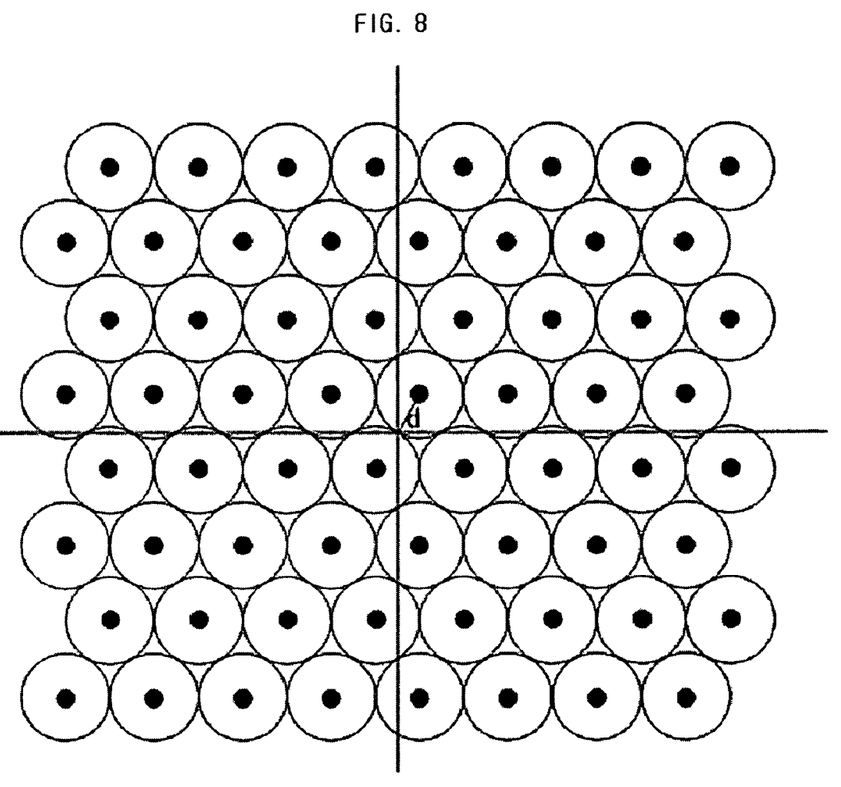
FIG. 8 illustrates a constellation in case of 64-QAM according to a preferred embodiment of the present invention.

Further, as described above, the present invention is limited to the 16-QAM having 16 constellation points, the present invention can be applied to various modulation methods FIG. 8 illustrates a constellation in case of 64-QAM according to a preferred embodiment of the present invention. As shown in FIG. 8, 64 constellation points are arranged to be angular point of equilateral triangle.

While the spirit of the invention has been described in detail with reference to preferred embodiments, it is to be appreciated that those skilled in the art can change or modify the embodiments without departing from the scope and spirit of the invention.

INDUSTRIAL APPLICABILITY

As described above, according to the present invention, power consumption can be reduced although distance between constellation points is maintained same as conventional case.

Further, according to the present invention, modulation symbol error rate can be reduced because distance between constellation points can be lengthen while maintaining same average power compared with conventional case.

What is claimed is:

1. A modulation method that transmits n bits per modulation symbol, comprising the steps of:

(a) generating a constellation of which $2^n$ constellation points are arranged to be angular point of equilateral triangle;
    (b) generating a modulation symbol by mapping the constellation point with n bit digital signal,
    wherein the constellation points have a lattice structure on an I/Q plot signal space figure, in which $2^{n/2}$ constellation points are arranged on each of $2^{n/2}$ rows parallel to an I-axis and $2^{(n/2-1)}$ constellation points are arranged on each of $2^{(n/2+1)}$ columns parallel to a Q-axis, n being an even value greater than two, and
    wherein, when the number of the constellation points is 16 and the distance between the constellation points is 2d, average consumption power of each constellation point is $9d^2$.

2. The method of claim 1, further comprising the step of transforming a digital signal into a parallel n bit digital signal, wherein the parallel n bits are mapped with the constellation point in said step (b).

3. The method of claim 1, further comprising the step of shifting the modulation symbol into high frequency using a carrier wave.

4. A modulation device that transmits n bits per modulation symbol, comprising:

a modulation symbol generator for mapping a parallel digital signal with constellation points of a constellation to generate a modulation symbol,
    wherein the constellation has a lattice structure on an I/Q plot signal space figure, in which $2^n$ constellation points are arranged to be at angular points of triangles that are in a lattice structure, and in which $2^{n/2}$ of the constellation points are arranged on each of $2^{n/2}$ rows parallel to an I-axis and $2^{(n/2-1)}$ of the constellation points are arranged on each of $2^{(n/2+1)}$ columns parallel to a Q-axis, n being an even value greater than two,
    wherein, when the number of the constellation points is 16 and the distance between the constellation points is 2d, average consumption power of each constellation point is $9d^2$.

5. The device of claim 4, further comprising a bit stream transformer for transforming an input digital signal into the parallel n bit digital signal, wherein the modulation symbol generator performs mapping the parallel n bit digital signal with the constellation points.

* * * * *